L. N. HALPERN AND L. GOLDSTEIN.
COMBINATION DENTAL FILM MOUNT AND DIAGNOSIS SHEET.
APPLICATION FILED SEPT. 24, 1920.
1,388,947.
Patented Aug. 30, 1921.
2 SHEETS—SHEET 1.
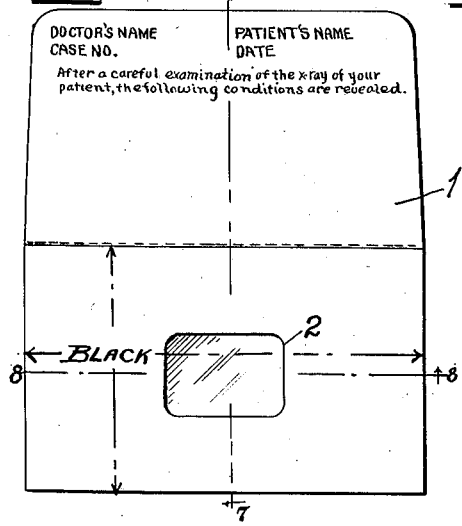
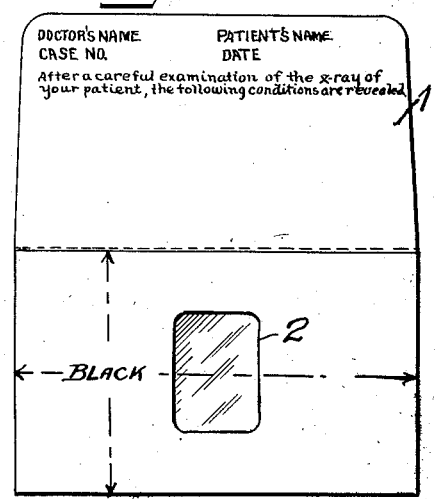
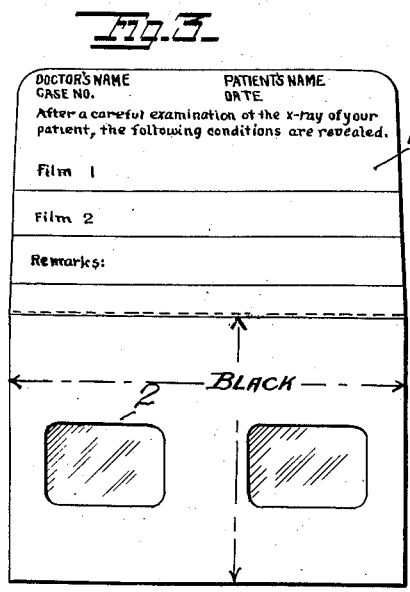
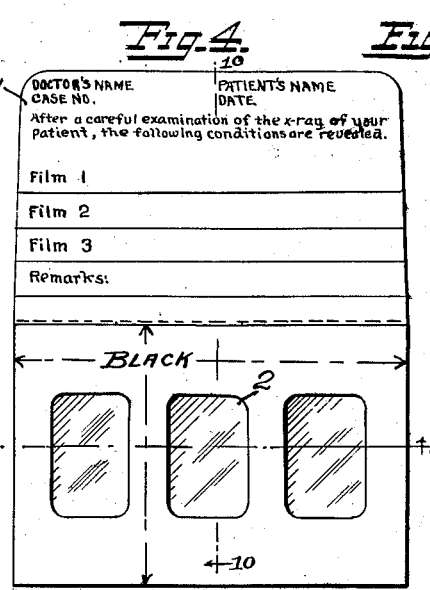
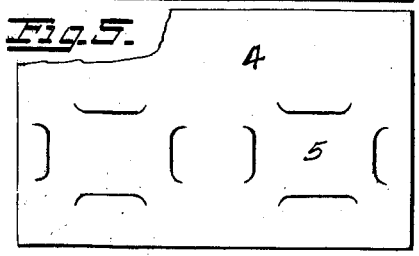
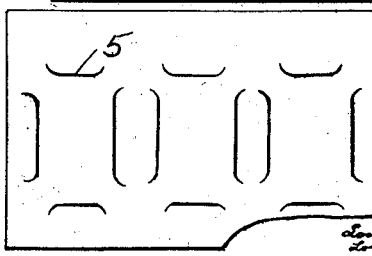
Inventors L. N. HALPERN AND L. GOLDSTEIN.
COMBINATION DENTAL FILM MOUNT AND DIAGNOSIS SHEET.
APPLICATION FILED SEPT. 24, 1920.
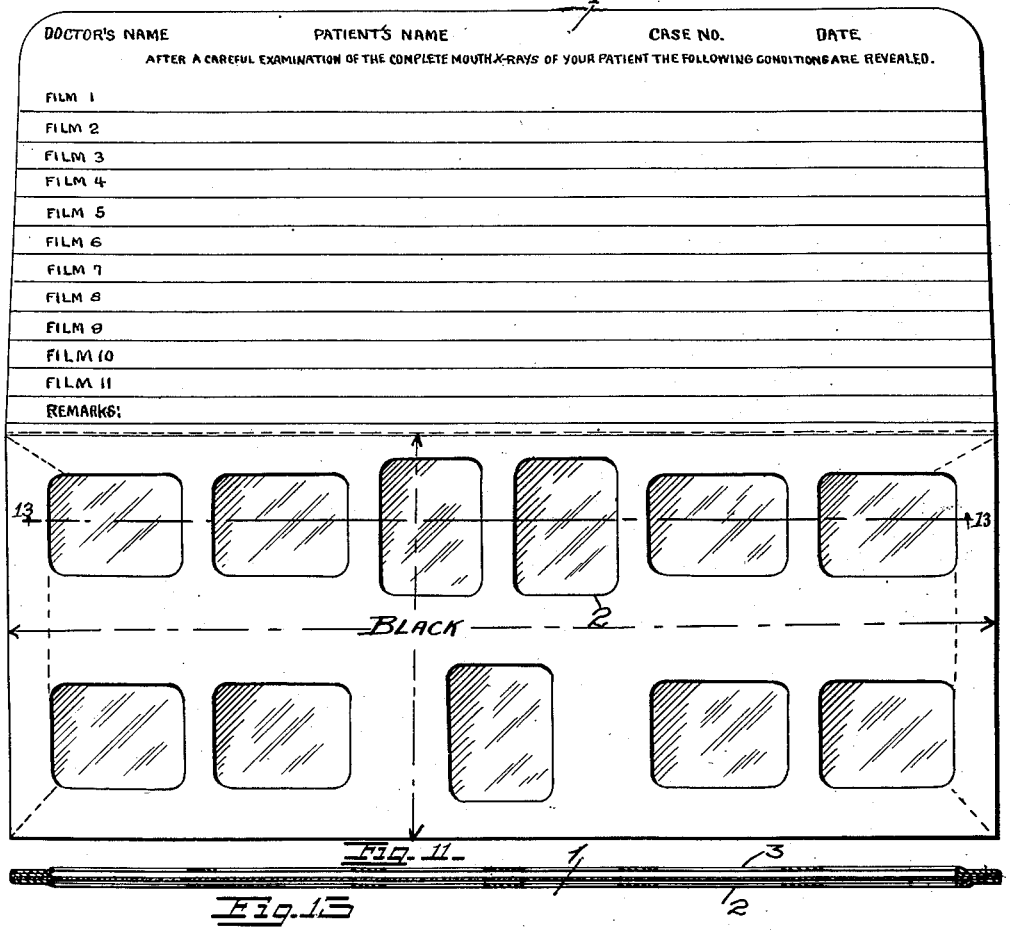
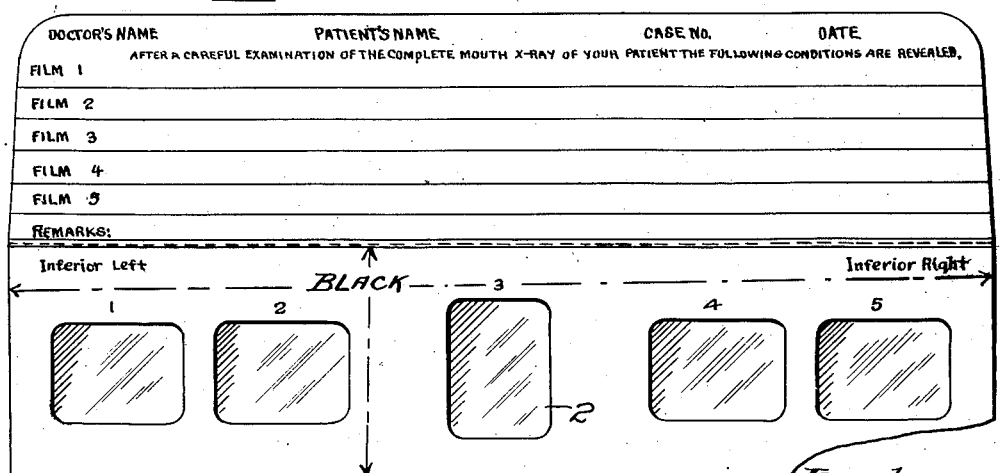

UNITED STATES PATENT OFFICE.

LOUIS N. HALPERN AND LOUIS GOLDSTEIN, OF NEW YORK, N. Y.

COMBINATION DENTAL FILM-MOUNT AND DIAGNOSIS-SHEET.

1,388,947.   Specification of Letters Patent.   Patented Aug. 30, 1921.

Application filed September 24, 1920. Serial No. 412,611.

*To all whom it may concern:*

Be it known that we, LOUIS N. HALPERN and LOUIS GOLDSTEIN, citizens of the United States, residing at New York, in the county of New York and State of New York, have invented certain new and useful Improvements in Combination Dental Film-Mounts and Diagnosis-Sheets.

Our invention relates to a device for holding dental X-ray films in a manner so that they can be readily inspected and at the same time providing in proximity to the film, a diagnosis sheet containing desirable data to be read in connection with the subject matter of the film.

One of the objects of the invention is to provide a mount of this character which can be cheaply manufactured and which will prevent the face of the film from becoming scratched when not in use.

Another object is to enable the dentist or physician to receive his films in an envelop and by holding the same up to the light immediately see the X-ray outline and his diagnosis and description of the subject matter, without having to resort to the usual expedients, such as an electric light behind the film, lights in a darkened room or by holding the film up to the window.

With these and other objects in view, our invention consists in certain novel and peculiar features of construction and combination of parts as will be more fully hereinafter set forth in the description and claims.

Referring to the drawings for a more complete disclosure of the invention,

Figures 1, 2, 3 and 4 are face views of mounts for holding different numbers of films in horizontal and vertical positions;

Figs. 5 and 6 are views of the transparent card to which the photographic films are attached before inserting the same in the envelop.

Figs. 7 and 8 are sections on the lines 7—7 and 8—8 respectively, of Fig. 1;

Figs. 9 and 10 are sections on the lines 9—9 and 10—10 respectively, of Fig. 4.

Figs. 11 and 12 are face views of the mount for holding eleven and five films respectively.

Fig. 13 is a section of the line 13—13 of Fig. 11.

Referring to the drawings, 1 is the flap of a paper envelop which has printed on its inner face suitable diagnostic indicia, which may include the doctor's name, the patient's name, the case number and the date. Where there are a plurality of films in the envelop blank spaces may be reserved for other data relating to the respective films. In the body of the envelop there is provided a window 2 in the front part thereof and a corresponding window 3 in the back part thereof. The flap of the envelop is of such size that it covers the windows when in folded down position and preferably is of the same length and width as the envelop.

For mounting the films preparatory to inserting them in the envelop, we provide a transparent celluloid card 4 of film material, having cut out flap portions 5, between which the photographic film is inserted and held in place. When so assembled the card is ready to be inserted in the envelop, with the developed face of the film facing the front of the envelop. While not being inspected, the flap of the envelop is turned down, thereby protecting the face of the film from injury by scratching.

The face of the body of the envelop is printed in black or other suitable contrasting color, to aid in reading the subject matter on the film.

The number and arrangement of film spaces in the mount will vary from one to a number sufficient to hold a complete series.

In Fig. 11 is shown a mount for holding a complete series of eleven films, the upper row containing the properly arranged films for the upper teeth and the lower row for the lower teeth.

From the above description it will be apparent that we have produced a device of the character specified, which possesses all the features enumerated as desirable and while we have illustrated and described the preferred forms of our invention, it will be understood that we reserve the right to all changes properly falling within the spirit and scope of the appended claims.

Therefore what we claim as new and desire to secure by Letters Patent is:—

1. A container for a radiograph mount comprising a paper envelop constructed of opposed sheets united along their edges and having one edge open to provide a pocket adapted to receive the said mount, registering apertures in the said sheets through which the radiograph may be viewed, a flap for closing the said pocket and foldable along a line adjacent the entrance to the said pocket and of sufficient area to cover the said apertures.

2. A container for a radiograph mount comprising an envelop, constructed of opposed sheets united along their edges and having one edge open to provide a pocket adapted to receive the said mount, registering apertures in the said sheets through which the radiograph may be viewed, the front face of the envelop being of a contrasting color, a flap for closing the said pocket and foldable along a line adjacent the entrance to the said pocket and of sufficient area to substantially cover the colored face of the envelop.

3. A container for a radiograph mount comprising an envelop constructed of opposed sheets united along their edges and having one edge open to provide a pocket adapted to receive the said mount, registering apertures in the said sheets through which the radiograph may be viewed, a flap for closing the said pocket and foldable along a line adjacent the entrance to the said pocket and of sufficient area to cover the said apertures, the said flap carrying diagnostic indicia on its inner side and readable while holding the envelop with the opening in the pocket uppermost.

4. A container for a radiograph mount comprising an envelop constructed of opposed sheets united along their edges and having one edge open to provide a pocket, a plurality of registering apertures in the said sheets, a transparent card provided with means for detachably securing thereto a plurality of films and adapted to be inserted in the envelop so that the said films will be in juxtaposition to the said apertures whereby a series of films may be viewed in predetermined relationship.

Dr. LOUIS N. HALPERN.
LOUIS GOLDSTEIN, D. D. S.

Witnesses:
Cecilia Fay,
Ross J. MacCann.